US008213449B1

(12) United States Patent
Wurtenberger et al.

(10) Patent No.: US 8,213,449 B1
(45) Date of Patent: *Jul. 3, 2012

(54) AGING EV-DO PAGES IN A QUEUE BASED ON LATENCY-SENSITIVITY

(75) Inventors: Andrew M. Wurtenberger, Olathe, KS (US); Rajveen Narendran, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 833 days.

This patent is subject to a terminal disclaimer.

(21) Appl. No.: 12/201,634

(22) Filed: Aug. 29, 2008

(51) Int. Cl.
*H04L 12/54* (2006.01)
(52) U.S. Cl. ........ 370/429; 370/335; 370/337; 370/342; 370/347; 370/413; 370/444; 375/342; 711/4; 711/106; 711/110; 711/117
(58) Field of Classification Search .................. 370/428, 370/429, 412, 413, 335, 336, 342, 441, 337, 370/347, 442, 443, 444; 375/342; 711/4, 711/106, 110, 117
See application file for complete search history.

(56) References Cited

U.S. PATENT DOCUMENTS

| 5,757,771 A | 5/1998 | Li et al. |
| 5,828,835 A | 10/1998 | Isfeld et al. |
| 6,064,677 A | 5/2000 | Kappler et al. |
| 6,205,118 B1 | 3/2001 | Rathnavelu |
| 6,408,006 B1 * | 6/2002 | Wolff ............................ 370/412 |
| 6,480,911 B1 * | 11/2002 | Lu ................................... 710/54 |
| 6,658,007 B1 | 12/2003 | Pasternak et al. |
| 6,724,721 B1 | 4/2004 | Cheriton |
| 6,810,426 B2 | 10/2004 | Mysore et al. |
| 6,876,952 B1 | 4/2005 | Kappler et al. |
| 7,474,642 B1 | 1/2009 | Chheda |
| 2002/0136230 A1 | 9/2002 | Dell et al. |
| 2003/0076804 A1 | 4/2003 | Sivalingham |
| 2006/0146721 A1 * | 7/2006 | Attar et al. ..................... 370/238 |
| 2006/0270447 A1 | 11/2006 | Everson et al. |
| 2007/0116243 A1 | 5/2007 | Ahn |
| 2008/0126641 A1 * | 5/2008 | Irish et al. ..................... 710/112 |

OTHER PUBLICATIONS

Non-Final Office Action from U.S. Appl. No. 10/405,745, mailed May 28, 2008.
Final Office Action from U.S. Appl. No. 10/405,745, mailed Dec. 16, 2008.
Non-Final Office Action from U.S. Appl. No. 11/558,691, mailed Apr. 14, 2009.
Final Office Action from U.S. Appl. No. 11/558,691, mailed Oct. 29, 2009.
Non-Final Office Action from U.S. Appl. No. 10/405,745, mailed May 3, 2006.

(Continued)

*Primary Examiner* — Christopher Grey (57) ABSTRACT

Methods and systems are provided for aging EV-DO pages in a queue based on latency-sensitivity. An access node receives data for access terminals, and responsively generates pages and adds them to the back of a queue. The access node associates a respective aging value with any latency-tolerant pages. The access node transmits the pages in the queue, which involves: (a) assessing the pages on a first-in, first-out basis; (b) transmitting latency-sensitive pages when those pages reach the front of the queue; (c) sending latency-tolerant pages to the back of the queue (and incrementing their aging values) when those pages reach the front of the queue with an aging value that is less than a maximum-delay parameter; and (d) transmitting latency-tolerant pages when those pages reach the front of the queue with an aging value that is greater than or equal to the maximum-delay parameter.

21 Claims, 4 Drawing Sheets

OTHER PUBLICATIONS

Advisory Action from U.S. Appl. No. 10/405,745, mailed Nov. 28, 2006.
Non-Final Office Action from U.S. Appl. No. 10/405,745, mailed Feb. 5, 2007.
Advisory Action from U.S. Appl. No. 10/405,745, mailed Dec. 27, 2007.
Non-Final Office Action from U.S. Appl. No. 11/558,691, mailed Jan. 27, 2011.
"The World is Watching PacketVideo—Wireless Media—Technology," http://www.packetvideo.com/prodtech/tech.asp (2 pages) printed from the World Wide Web on Oct. 25, 2002.
Surprise 2000, Network Management & Quality of Service (QoS) over the Internet, "Introduction: What is Quality of Service?" http://www.iis.ee.ic.ac.uk/~frank/surp00/article1/goap98/ (6 pages) printed from the World Wide Web on Mar. 14, 2003.
Bellavista et al., "An Active Middleware to Control QoS Level of Multimedia Services," http://arch1.cs.ccu.edu.tw/~wry89/1105/an-active-middleware-to.pdf (8 pages) printed from the World Wide Web on Oct. 25, 2002.
Swinburne Information Technology Services—Networks, "Quality of Service (QOS)," http://www.networks.swin.edu.au/services/qos/ (5 pages) printed from the World Wide Web on Mar. 14, 2003.
Keshav, Integrated Services, http://www.cl.cam.ac.uk/Teaching/2002/DigiComm2/int-serve-tech.pdf (41 pages) printed from the World Wide Web on Nov. 12, 2002.
Unpublished U.S. Appl. No. 10/405,745, entitled "Method and System for Hierarchically Queuing Data based on Data Type and Destination," filed Apr. 2, 2003 in the name of Yarkosky et al.
Unpublished U.S. Appl. No. 11/558,691, entitled "Prioritized EV-DO Paging Based on Type of Packet Flow," filed Nov. 10, 2006 in the name of Talley et al.
Non-Final Office Action mailed Jun. 8, 2011 for U.S. Appl. No. 11/558,961.
Response filed Sep. 7, 2011 to the Non-Final Office Action mailed Jun. 8, 2011 for U.S. Appl. No. 11/558,961.
Notice of Allowance mailed Oct. 13, 2011 for U.S. Appl. No. 11/558,691.

* cited by examiner

AGING EV-DO PAGES IN A QUEUE BASED ON LATENCY-SENSITIVITY

BACKGROUND

1. Technical Field

The present invention relates to wireless communications, and, more particularly, to management of wireless communications between Evolution Data Optimized (EV-DO) access nodes and EV-DO access terminals.

2. Description of Related Art

Many people use mobile stations, such as cell phones and personal digital assistants (PDAs), to communicate with cellular wireless networks. These mobile stations and networks typically communicate with each other over a radio frequency (RF) air interface according to a wireless communication protocol such as Code Division Multiple Access (CDMA), perhaps in conformance with one or more industry specifications such as IS-95 and IS-2000. Wireless networks that operate according to these specifications are often referred to as "1xRTT networks" (or "1x networks" for short), which stands for "Single Carrier Radio Transmission Technology." These networks typically provide communication services such as voice, Short Message Service (SMS) messaging, and packet-data communication.

Recently, service providers have introduced mobile stations and wireless networks that communicate using a CDMA protocol known as EV-DO, which stands for "Evolution Data Optimized." EV-DO networks, operating in conformance with industry specification IS-856, provide high rate packet-data service (including Voice over IP (VoIP) service) to mobile stations using a combination of time-division multiplexing (TDM) on the forward link (from the network to mobile stations) and CDMA technology on the reverse link (from mobile stations to the network). Furthermore, some mobile stations, known as hybrid mobile stations or hybrid access terminals, can communicate with both 1x networks and EV-DO networks.

In the EV-DO context, a mobile station is typically referred to as an access terminal, while the network entity with which the access terminal communicates over the air interface is known as an access node. The access node typically includes a device known as a radio network controller (RNC), which is similar to a base station controller (BSC) in 1x networks. The access node also includes one or more base transceiver stations (BTSs) or "Node-Bs," each of which include one or more antennas that radiate to define respective wireless coverage areas. Among other functions, the RNC controls one or more BTSs, and acts as a conduit between the BTSs and an entity known as a packet data serving node (PDSN), which provides access to a packet-data network. Thus, when positioned in one of these wireless coverage areas, an access terminal may communicate over the packet-data network via the access node and the PDSN.

In addition to VoIP communication, access terminals frequently engage in other types of packet-data communication, such as instant messaging (IM) and web browsing. Each instance of an access terminal engaging in a type of packet-data communication for a period of time may be deemed a "packet flow," which would typically involve Internet Protocol (IP) packets being sent and received by the access terminal. For example, a given VoIP call may be referred to as a VoIP packet flow. Thus, as examples, an access terminal may engage in VoIP packet flows, IM packet flows, push-to-talk (PTT) packet flows, streaming-video packet flows, streaming-audio packet flows, video-telephony packet flows, and best-effort packet flows such as web-browsing packet flows and file-transfer-protocol (FTP) packet flows.

To address the fact that access terminals engage in these various types of packet flows, a particular revision of EV-DO specifications, known as EV-DO Rev. A ("EV-DO-A"), provides for what are known as profile IDs, which are identifiers associated on a one-to-one basis with types of packet flows. Thus, one profile ID may be associated with VoIP packet flows (i.e., "conversational voice"), while another may be associated with best-effort packet flows, and so on. Again, an access terminal may be able to communicate according to more than one profile ID, reflecting that it can engage in more than one type of packet flow.

Furthermore, to participate in one or more of these various types of packet flows, an access terminal may run (i.e., launch, enable, execute, etc.) particular communication applications, perhaps in response to receiving one or more user commands. As an example, to be able to participate in push-to-talk (PTT) packet flows, the access terminal may enable a PTT application. As another example, to be able to participate in IM packet flows, an access terminal may run an IM application. As yet another example, to be able to engage in web-browsing packet flows, an access terminal may launch a web browser.

To initiate connectivity, when powered on in a coverage area of an access node, an access terminal may send what is known as a Universal Access Terminal Identifier (UATI) request to the access node. The access node may respond by granting a UATI to the access terminal in a message known as a UATI response. This UATI response typically contains the granted UATI, which then serves to identify the access terminal to the access node for some period of time.

After acquiring a UATI, the access terminal will typically communicate with the access node over the air interface to set up what is referred to as a "session." Essentially, an access terminal that has a session with an access node can engage in packet-data communication over the packet-data network to which the access node and the PDSN provide access. Conversely, an access terminal that does not have a session with an access node can not engage in packet-data communication over the packet-data network.

As part of setting up the session, the access terminal sends a connection request to the access node, requesting an air-interface connection. The access node will responsively work to establish the air-interface connection with the access terminal, which involves the access node instructing the access terminal to communicate with the access node over what is known as a traffic channel. This traffic channel takes the form of particular timeslots on the forward link, during which the access node sends data to the access terminal, and a particular CDMA channel on the reverse link, over which the access terminal sends data to the access node.

In addition to establishing the connection with the access terminal, the access node takes a number of other actions, one of which is to validate that the access terminal is authorized to engage in packet-data communication via the access node. Another such action is to set up a radio-packet (e.g., A10/A11) connection between the access node and the PDSN on behalf of the access terminal. The access node also facilitates establishment of a data link (e.g., a point-to-point protocol (PPP) connection) between the access terminal and the PDSN. The access node may also facilitate assignment (e.g., by the PDSN or by a Mobile-IP home agent) of an IP address to the access terminal. Finally, the access terminal and the access node negotiate over the traffic channel to agree on a set of profile IDs for the access terminal to use during the session; in other words, they agree as to the types of packet flows in which the access terminal is capable of engaging and in which the access terminal is permitted to engage.

Once those steps are complete, the access terminal has a session with the access node, and can therefore communicate over the packet-data network via the access node and the PDSN, according to the agreed-upon set of profile IDs. The air-interface connection is then typically torn down, freeing up those resources for other access terminals. Both the network and the access terminal maintain data pertaining to the rest of what was established, however, including the IP address, radio-packet connection, and data link. This transition from having a traffic channel to not having one is referred to as the access terminal going from active to dormant.

Thereafter, if the access terminal wants to initiate communication, it will send another connection request to the access node, which will again assign a traffic channel to the access terminal. If, on the other hand, the access node receives data addressed to the access terminal (and the access terminal does not currently have an active traffic channel), the access node would typically send a page to the access terminal over a channel known as the control channel.

Perhaps in that page, or in an ensuing message, the access node will assign a traffic channel to the access terminal. The access terminal can then engage in one or more packet flows of any of the negotiated types, over the packet-data network, using the traffic channel, as well as the previously-established IP address, radio-packet connection, and data link. As part of setting up a packet flow, either the access terminal or the access node, or both, may send the other a message known as a ReservationOnRequest (RoR), which includes at least one profile ID, indicating the type of packet flow that is being requested. Once an RoR has been sent and acknowledged, the access terminal has an "open reservation" on the traffic channel, associated with the profile ID that was included in the RoR; in other words, the open reservation is associated with the type of packet flow in which the access terminal is then able to engage. An access terminal may have multiple open reservations on the traffic channel, corresponding to the fact that the access terminal can engage in multiple packet flows at one time.

The network typically uses this profile-ID information to apply a particular quality of service (QoS) to the packet flow, which essentially means providing a particular level of packet forwarding (or "expedited forwarding") treatment to certain packet flows. This traffic shaping is also known as "DiffServ" ("differentiated services"). Thus, a profile ID effectively represents a set of QoS characteristics to be applied to a packet flow.

SUMMARY

Methods and systems are provided for aging EV-DO pages in a queue based on latency-sensitivity. In one aspect of the present invention, an exemplary embodiment may take the form of a method, in accordance with which an access node provides service to a plurality of access terminals in a wireless coverage area. The access node receives data respectively addressed to at least some of the access terminals, and responsively (i) generates pages for transmission in the wireless coverage area and (ii) adds the generated pages to a back of a queue, the queue being ordered from a front to the back. The access node determines which pages in the queue are latency-sensitive pages respectively associated with latency-sensitive packet flows, and which pages in the queue are latency-tolerant pages respectively associated with latency-tolerant packet flows, and responsively associates a respective aging value with any latency-tolerant pages, wherein each aging value is initialized to a starting value.

The access node transmits the pages in the queue in the wireless coverage area, wherein transmitting the pages in the queue in the wireless coverage area comprises: (a) assessing the pages in the queue on a first-in, first-out basis; (b) transmitting latency-sensitive pages when those pages reach the front of the queue; (c) sending latency-tolerant pages to the back of the queue and incrementing their aging value when those pages reach the front of the queue with an aging value that is less than a maximum-delay parameter; and (d) transmitting latency-tolerant pages when those pages reach the front of the queue with an aging value that is greater than or equal to the maximum-delay parameter.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

DETAILED DESCRIPTION OF EXEMPLARY EMBODIMENTS

1. Overview

Some types of packet flows conducted by access terminals are more latency-sensitive than others. That is, there are latency-sensitive packet flows, such as VoIP and PTT, and there are latency-tolerant packet flows, such as best-effort (e.g. web-browsing) packet flows. Thus, a service provider may classify certain types of packet flows as latency-sensitive, while classifying other types of packet flows as latency-tolerant. The service provider may further configure an access node (and perhaps specifically one or more RNCs) to store—or at least have access to—data that correlates different types of packet flows (e.g. different profile IDs) with either an indication of being latency-sensitive or and indication of being latency-tolerant.

In some embodiments, packet flows that relate to voice communication (including VoIP and PTT) may be associated with a discrete range of profile IDs, such as profile IDs 1280 through 1283; those profile IDs in that range may be considered latency-sensitive, while all others may be considered latency-tolerant. In some embodiments, best-effort packet flows may be associated with profile ID 0, and may be considered latency-tolerant. And many other examples are possible without departing from the invention; for example, packet flows could be more finely classified according to any number of levels of latency-sensitivity (and thus implicitly latency-tolerance), as two levels are used herein for illustration.

As such, when an access node receives data addressed to an access terminal that does not currently have an active traffic channel, the access node may generate a page to be sent to the access terminal, to initiate establishment of an air-interface connection (i.e. a traffic channel) between the access node and the access terminal. The access node may further examine the data and identify that it is associated with a particular profile ID. Based on that profile ID, the access node may determine whether the data is associated with a latency-sensitive packet flow or rather with a latency-tolerant packet flow. If the data is associated with a latency-sensitive packet flow, the access node may transmit the page to the access terminal with a high level of priority. If the data is associated with a latency-tolerant packet flow, the access node may transmit the page to the access terminal with a low level of priority.

As a result, on average, latency-sensitive packet flows will be set up more quickly than they otherwise would be. More particularly, on average, latency-sensitive packet flows will be set up more quickly than they are in existing EV-DO network implementations, which accord the same level of priority to all pages, regardless of the type of packet flow to which they pertain, and simply send all pages on a first-in-first-out (FIFO) basis. In general, it is desirable that setup times for latency-sensitive packet flows be minimized, to improve the user experience for, in the case of a VoIP call for example, at least the calling party. Calling parties, on average, will experience faster response times in reaching called parties.

With respect to carrying out prioritization of pages for latency-sensitive packet flows over pages for latency-tolerant packet flows, this could be accomplished many different ways. In general, an access node may have the ability to send out a given number of pages each time the access node transmits a standard amount of control-channel information on the control channel. In EV-DO, the access node transmits forward-link data in timeslots that last approximately 1.67 ms. Each sequence of 16 slots makes up what is known as a frame, which lasts approximately 26.67 ms. The control channel is typically transmitted on a series of either 8 or 16 slots once every 16 frames, or once every approximately 426.67 ms.

If 8 slots are used for the control channel, then each control-channel transmission would last approximately 13.33 ms. If 16 slots are used, however, then each control-channel transmission would last approximately 26.67 ms. Whether 8 or 16 slots are used depends on the bit rate that the access node uses to transmit the control channel. This control-channel bit rate can typically be set to either 38.4 kbps, in which case 16 slots are used, or 76.8 kbps, in which case 8 slots are used. Either way, the same standard amount of control-channel information is transmitted to access terminals on a given carrier in a given wireless coverage area, such as a sector, each time the access node transmits the control channel.

In this standard amount of control-channel information is a set number of pages that the access terminal can send out each time it transmits the control channel. In accordance with the present invention, with respect to this limited resource, the access node will give higher priority to pages related to latency-sensitive packet flows ("latency-sensitive pages") than it will to pages related to latency-tolerant packet flows ("latency-tolerant pages"). As stated, this giving of higher priority can be implemented in different ways.

In one embodiment, the access node may implement a queue of pages to be sent out over the control channel. Furthermore, the access node may store an indication associated with each queued page as to whether that page is a latency-sensitive page or rather a latency-tolerant page. Furthermore, the access node may associate a respective aging value (e.g. an integer counter value that may be initialized to 0, and can be incremented) with each latency-tolerant page. In times when the control channel is not congested (which may be determined by, for example, assessing the total number of pages in the queue, the number of pages sent out over some preceding time period, and/or some other factor(s)), this aging value may not come into play: that is, the access node may simply use a first-in, first-out approach to sending pages.

However, in times when the control channel is congested, the access node may use the aging values respectively associated with the latency-tolerant pages in the queue to age those pages some number of times through the queue prior to sending them out. More particularly, when a latency-sensitive page reaches the front of the queue, that latency-sensitive page may be sent out immediately. However, when a latency-tolerant page reaches the front of the queue, the access node may check that page's aging value: if the aging value is less than a max-delay parameter (i.e. a certain threshold value), the access node may increment that page's aging value and send that page back to the end of the queue; if that page's aging value is equal to that max-delay parameter, the access node may send that page out immediately.

In this way, latency-sensitive pages will be favored over latency-tolerant pages, but latency-tolerant pages will not be stuck in the queue forever. In some embodiments, aging of latency-tolerant pages may be implemented even when the control channel is not congested. In other embodiments, one category of pages may be aged while another may not, even if those categories are not delineated along latency-sensitivity/tolerance lines. And many other examples are possible as well, without departing from the invention. For example, as stated, more than two latency-sensitivity categories may be used, each having its own max-delay parameter. Pages for the most latency-sensitive category of packet flows (e.g. PTT) could have a max-delay parameter equal to 0, to ensure immediate transmission upon reaching the front of the queue. A second category (e.g. VoIP) could have a second max-delay parameter, while a third category (e.g. IM) could have a third max-delay parameter. And so on.

Among the reasons for granting priority to latency-sensitive pages over latency-tolerant pages is that latency-sensitive pages may need to be prioritized for their associated packet flows to ever happen, while latency-tolerant pages are typically associated with packet flows that, even if the paging is delayed, will still happen, albeit perhaps at a worse level of user experience. For example, a VoIP call may never happen if the paging takes so long that the calling party decides not to wait. In contrast, for web-browsing, the access node may have a buffer where it stores the substantive data (HTML data) that it wants to deliver to the access terminal. If paging is delayed enough, that buffer may overflow and some of the earlier data to be stored therein may be lost. However, transmission protocols such as the Transmission Control Protocol (TCP) may remedy this through retransmission of non-acknowledged or non-received data. And it may be that no such safeguards are in place for VoIP, PTT, and other latency-sensitive packet flows.

Finally, it should be noted that the above overview is illustrative and not limiting. That is, additional and/or different features may be present in some embodiments of the present invention. It should be noted as well that any description of an access node or other network element providing service or communicating according to EV-DO is by way of example; any suitable mode of wireless communication (e.g. protocol) may be used instead, such as 1xRTT CDMA, iDEN, TDMA, AMPS, GSM, GPRS, UMTS, EDGE, WiMax (e.g. IEEE 802.16), LTE, microwave, satellite, MMDS, Wi-Fi (e.g. IEEE 802.11), Bluetooth, infrared, and/or any other now known or later developed.

2. Exemplary Architecture a. Exemplary Communication System

Figure 1:
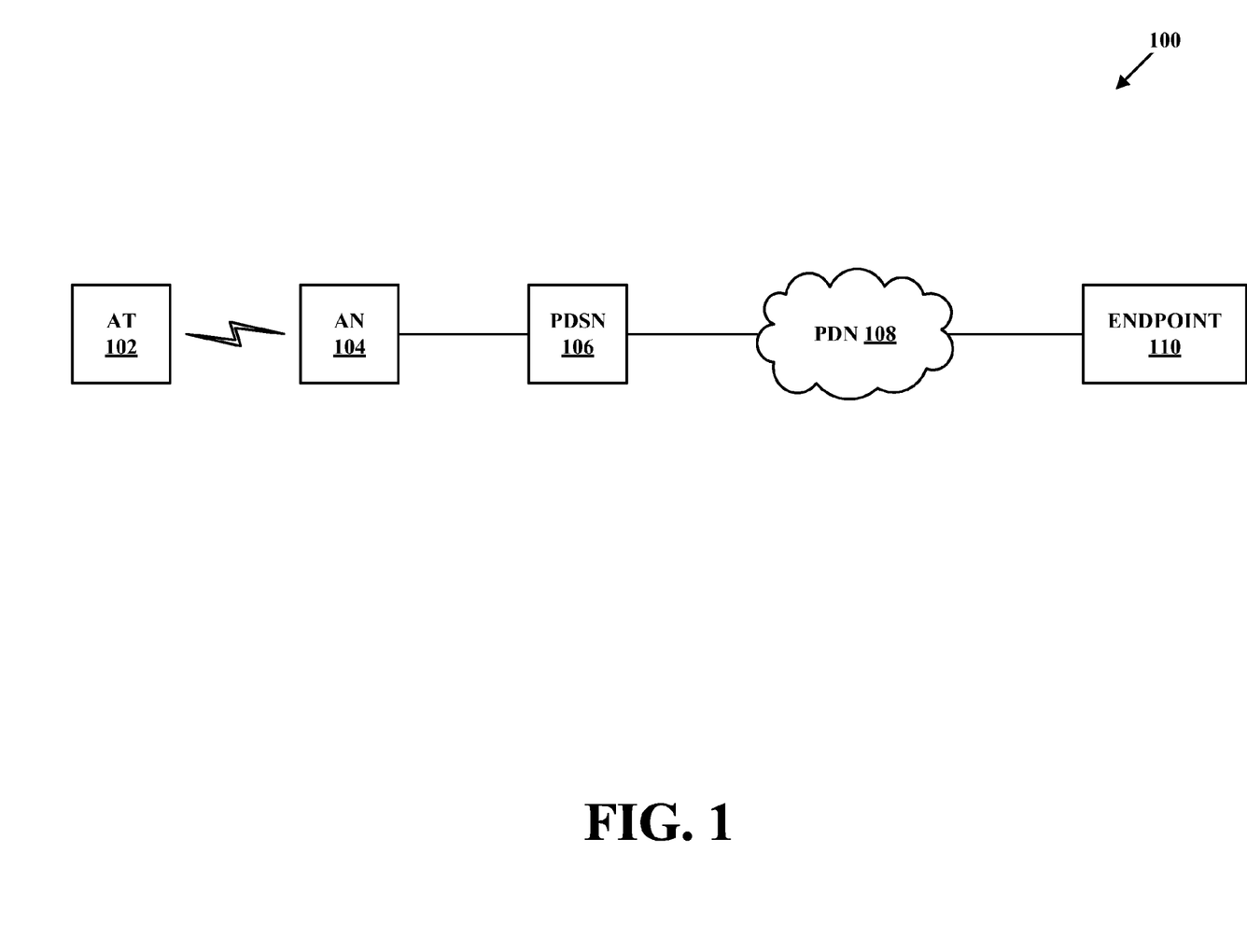
FIG. 1 is a simplified block diagram of a communication system, in accordance with exemplary embodiments.

FIG. 1 is a simplified block diagram of a communication system, in accordance with exemplary embodiments. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1, a communication system 100 includes an access terminal (AT) 102, an access node (AN) 104, a PDSN 106, a packet-data network (PDN) 108, and an endpoint 110. Note that additional entities not depicted in FIG. 1 could be present as well. As an example, there could be more than one access terminal in communication with access node 104; furthermore, there could be additional entities in communication with PDN 108. Also, there could be one or more devices and/or networks making up at least part of one or more of the communication links depicted in FIG. 1. As an example, there could be one or more routers, switches, or other devices or networks on the link between PDSN 106 and PDN 108.

Access terminal 102 may be any mobile device arranged to carry out the access-terminal functions described herein. As such, access terminal 102 may include a user interface, a wireless-communication interface, a processor, and data storage comprising instructions executable by the processor for carrying out the access-terminal functions described herein. The user interface may include buttons, a touch-screen, a microphone, and/or any other elements for receiving inputs from users, as well as a speaker, one or more displays, and/or any other elements for communicating outputs to users.

The wireless-communication interface may comprise an antenna and a chipset for communicating with one or more access nodes over an air interface. As an example, the chipset could be one suitable for engaging in EV-DO (perhaps EV-DO-A) communications. The chipset or wireless-communication interface in general may also be able to communicate with a CDMA network, a Wi-Fi network, and/or one or more additional types of wireless networks. The processor and data storage may be any suitable components known to those of skill in the art. As examples, access terminal 102 could be or include a cell phone, a PDA, a computer, a laptop computer, a hybrid IS-2000/IS-856 device, and/or a multi-mode Wi-Fi/cellular device.

Access node 104 may be any one or any combination of network elements arranged to carry out the access-node functions described herein. As such, access node 104 may include a communication interface, a processor, and data storage comprising instructions executable by the processor to carry out the access-node functions described herein. The communication interface may include one or more antennas and chipsets or other components for providing one or more EV-DO coverage areas such as cells or sectors, for communicating with access terminals such as access terminal 102 over an air interface. The communication interface may also include a wired packet-data interface such as an Ethernet interface for communicating directly or over one or more networks with PDSN 106. Access node 104 may include one or more base transceiver stations (BTSs) (or "Node-Bs"), as well as one or more radio network controllers (RNCs).

Figure 2:
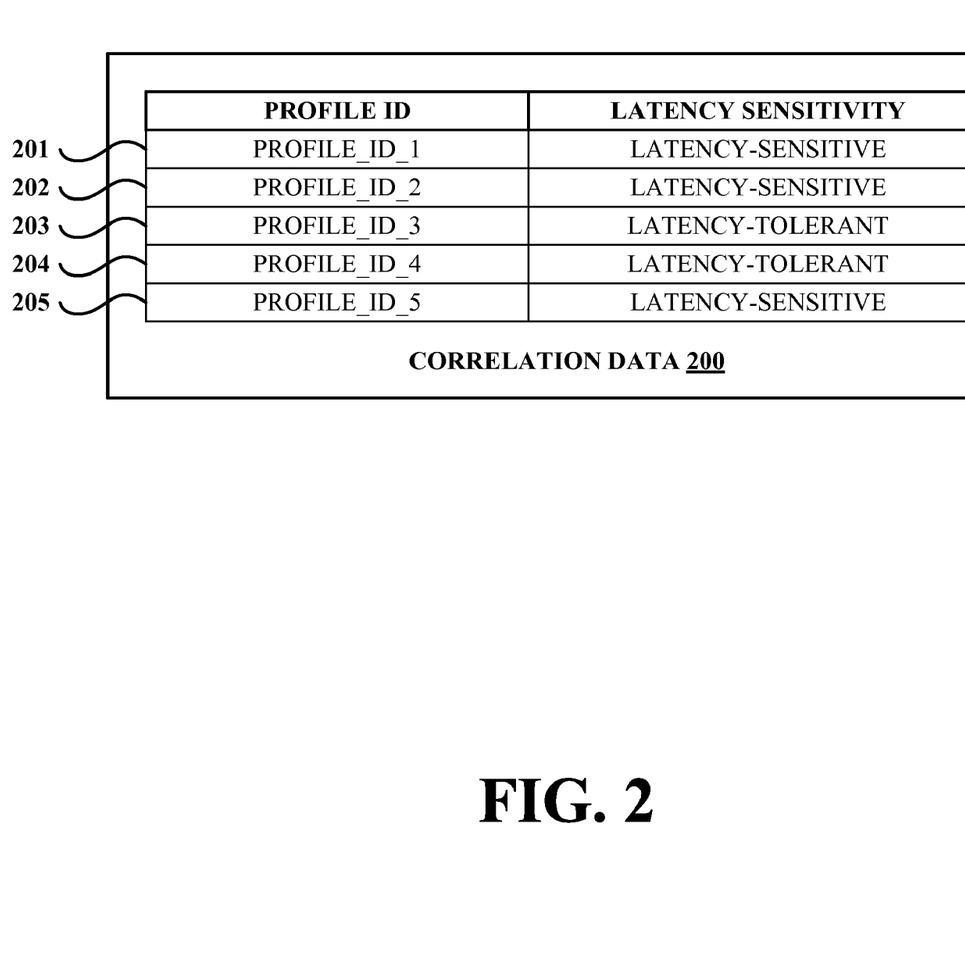
FIG. 2 is a simplified block diagram of correlation data, in accordance with exemplary embodiments.

Furthermore, access node 104 may store correlation data such as that depicted in FIG. 2, in which correlation data 200 is depicted as a table having five rows, 201-205. Each row correlates a respective profile ID with either an indication of being latency-sensitive or an indication of being latency-tolerant. Rows 201, 202, and 205 respectively depict profile IDs "PROFILE_ID_1," "PROFILE_ID_2," and "PROFILE_ID_5" correlated with an indication of being latency-sensitive. Rows 203 and 204 respectively depict profile IDs "PROFILE_ID_3" and "PROFILE_ID_4" correlated with an indication of being latency-tolerant. More or fewer correlations could be used, as five as used as an example. Also, a greater number of levels of latency-sensitivity could be used, as two is show as an example. And other ways of associating profile IDs or groups of profile IDs—or packet-flow-type indicia generally—with various levels of latency-sensitivity (and thus latency-tolerance) could be used as well.

Returning to FIG. 1, PDSN 106 may be any networking server or other device arranged to carry out the PDSN functions described herein. As such, PDSN 106 may include a communication interface, a processor, and data storage comprising instructions executable by the processor for carrying out the PDSN functions described herein. The communication interface may include a wired packet-data interface such as an Ethernet interface for communicating with access node 104 and over PDN 108. Note that PDSN 106 may, instead or in addition, comprise a wireless-communication interface for communicating with PDSN 106 and over PDN 108. Note as well that PDSN 106 may use the same interface or separate interfaces for communicating with access node 104 and for communicating over PDN 108.

PDN 108 may include one or more wide area networks, one or more local area networks, one or more public networks such as the Internet, one or more private networks, one or more wired networks, one or more wireless networks, and/or one or more networks of any other variety. Devices in communication with PDN 108 may exchange data using a packet-switched protocol such as IP, and may be identified by an address such as an IP address.

Endpoint 110 may be any device arranged to engage in one or more packet flows with access terminal 102 via PDN 108, PDSN 106, and access node 104, and to carry out the endpoint functions described herein. As such, endpoint 110 may include a communication interface, a processor, and data storage comprising instructions executable by the processor for carrying out the endpoint functions described herein. As examples, endpoint 110 could be or include a packet-based telephone, a computer, an access terminal, a cell phone, a PDA, a server (such as a call server, a VoIP server, a PTT server, a proxy (such as a Session Initiation Protocol (SIP) proxy))), and/or any other type of endpoint.

3. Exemplary Operation a. A First Exemplary Method

Figure 3:
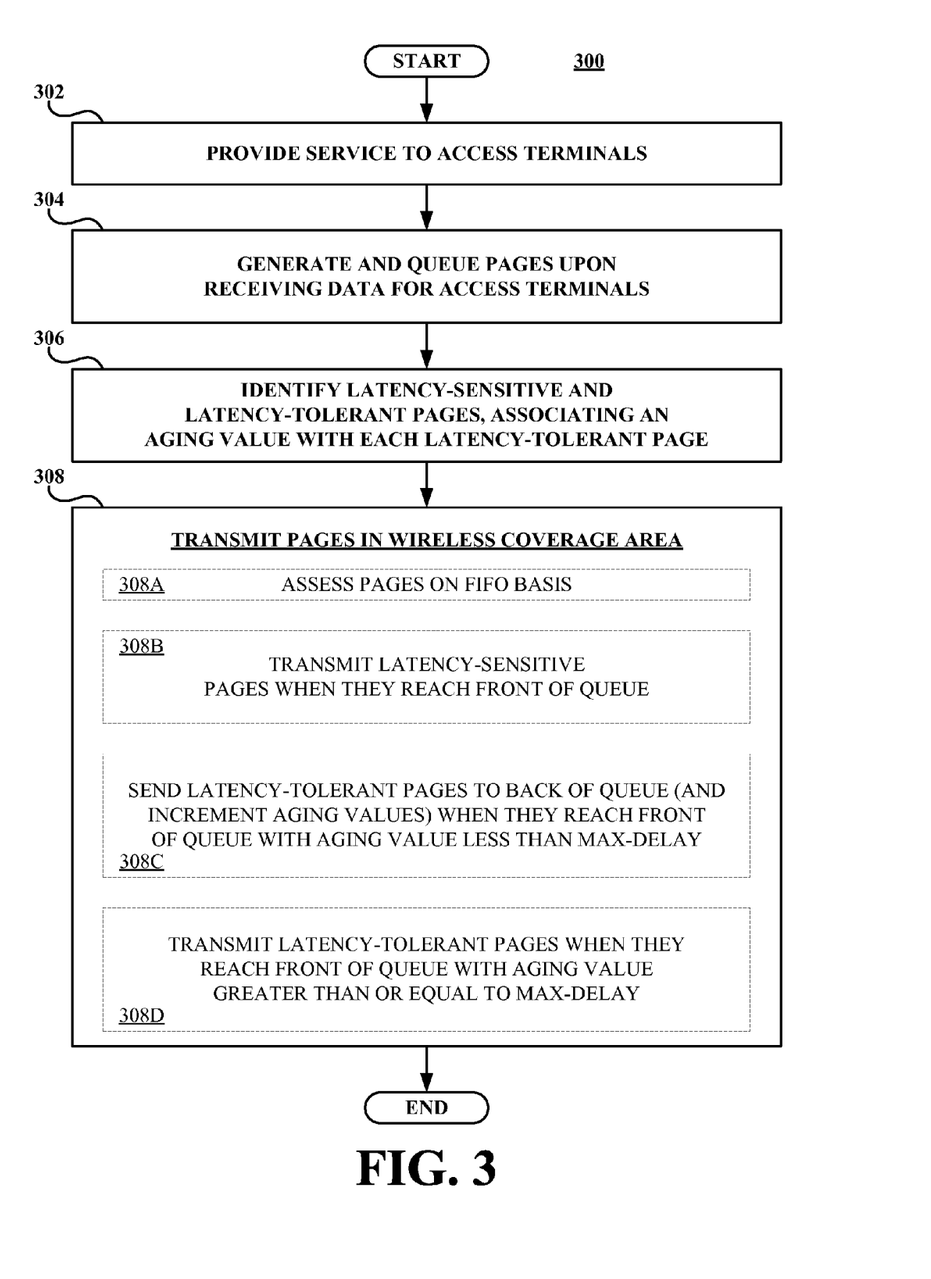
FIG. 3 is a flowchart of a method, in accordance with exemplary embodiments.

FIG. 3 depicts a flowchart of an exemplary method, in accordance with an exemplary embodiment. Although method 300 is described herein as being carried out by access node 104, this is not required. In some embodiments, method 300 may be carried out specifically by an RNC or BTS. In other embodiments, method 300 could be carried out by one or more servers, a gateway, a proxy, a BSC, a PDSN, any network element mentioned herein, some other network element, or perhaps some combination of these. And other possibilities exist as well. In some embodiments, method 300 may be carried out in response to determining that a control channel for transmitting pages in a wireless coverage area is congested, according to any of the metrics for control-channel congestion given above, and/or any others.

As shown in FIG. 3, method 300 begins at step 302, when access node 104 provides service to a plurality of access terminals in a wireless coverage area, which could be a cell or sector, as examples. The service may comprise EV-DO service, perhaps in compliance with one or more industry standards such as IS-856, Rev. 0 and IS-856, Rev. A, both of which are incorporated herein by reference. Preferably, the service includes EV-DO-A service. The access terminals may be or include EV-DO access terminals, one of more of which may be or include a cell phone, a PDA, a computer, a laptop computer, a hybrid IS-2000/IS-856 device, and a multi-mode Wi-Fi/cellular device. Access node 104 may, as part of setting up sessions with these access terminals, negotiate with the access terminals a respective set of types of packet flows in which the access terminals are capable of engaging and permitted to engage.

At step 304, access node 104 receives data respectively addressed to at least some of the access terminals, and responsively (i) generates pages for transmission in the wireless coverage area and (ii) adds the generated pages to a back of a queue, the queue being ordered from a front to the back. This queue may be the paging queue implemented in EV-DO access nodes in connection with the control channel, and may generally be used to transmit pages to access terminals. Each such page may include information to alert a given access terminal as to the receipt by access node 104 of data intended for the access terminal, and also include information to cause the access terminal to request a traffic channel for conducting a packet flow.

At step 306, access node 104 determines which pages in the queue are latency-sensitive pages respectively associated with latency-sensitive packet flows, and which pages in the queue are latency-tolerant pages respectively associated with latency-tolerant packet flows, and responsively associates a respective aging value with any latency-tolerant pages, wherein each aging value is initialized to a starting value (e.g. zero). As an example, each page may be a data structure that includes a field that can be used as the aging value. As another example, access node 104 may maintain a separate list of aging values associated with particular pages. And other examples are possible as well.

In some embodiments, the data addressed to a given access terminal may be associated with (e.g. include) a packet-flow-type indication (e.g. a profile ID); as such, step 306 may involve determining whether that packet-flow-type indication is associated with latency-sensitivity or rather with latency-tolerance, perhaps involving referencing correlation data (such as correlation data 200) that correlates each of a plurality of packet-flow types (e.g. profile IDs) with an indication of being latency-sensitive or rather latency-tolerant. And other examples are possible as well. A given profile ID may indicate that a given packet flow (and thus the page associated therewith) corresponds to a type selected from the group consisting of VoIP, PTT, high-performance push-to-talk (HPPTT), streaming-video, streaming-audio, video-telephony, best efforts, web-browsing, and FTP, to name but a few examples.

In some embodiments, a given profile ID or other packet-flow-type indication may indicate that a given packet flow (and thus the page associated therewith) corresponds to a type referred to here as push-to-x (PTX), which is used here as a general term for any existing or hereafter developed technology wherein one or more users can access a communications service in a manner similar to the way PTT service is accessed, though the underlying service may involve audio and/or video communication, sending picture mail, and/or any other service. Thus, PTX may include push-to-audio, push-to-video, push-to-picturemail, and/or push-to any other form of communication service now known or hereafter developed, without departing from the invention. It is contemplated that most if not all PTX applications would be considered latency-sensitive (when the two choices are latency-tolerant and latency-sensitive).

At step 308, access node 104 transmits the pages in the queue in the wireless coverage area (e.g. over the control channel). As shown in FIG. 3, and as described above, transmitting the pages in the queue in the wireless coverage area may involve the substeps of (a) assessing the pages in the queue on a first-in, first-out basis (step 308A), (b) transmitting latency-sensitive pages when those pages reach the front of the queue (step 308B), (c) sending latency-tolerant pages to the back of the queue and incrementing their aging value (e.g. by one) when those pages reach the front of the queue with an aging value that is less than a maximum-delay parameter, and (d) transmitting latency-tolerant pages when those pages reach the front of the queue with an aging value that is greater than or equal to the maximum-delay parameter (step 308D).

b. A Second Exemplary Method

Figure 4:
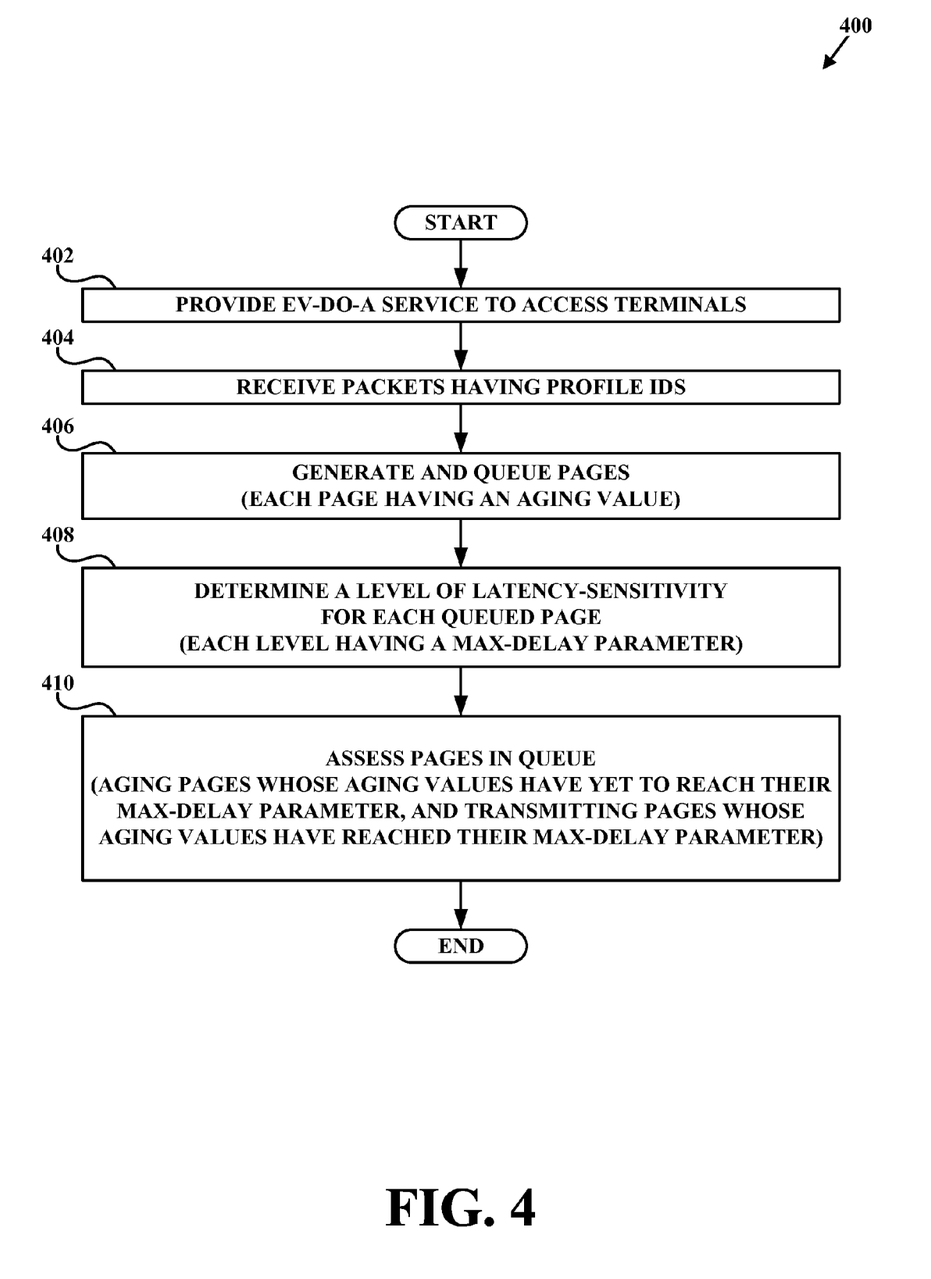
FIG. 4 is a flowchart of a method, in accordance with exemplary embodiments.

FIG. 4 is a flowchart of an exemplary method, in accordance with an exemplary embodiment. As with method 300 of FIG. 3, method 400 of FIG. 4 is described as being carried out by an access node, and by access node 104 of FIG. 1 in particular, though this is not required. Method 400 could be carried out by any one or any combination of the entities described as possibilities for method 300, and/or any other entity or entities. Method 400 is similar in some respects to method 300, and thus is not described in as great of detail.

As shown in FIG. 4, a method 400 begins at step 402, when access node 104 provides EV-DO-A service to EV-DO-A access terminals in a wireless coverage area (e.g. a cell or a sector). At step 404, access node 104 receives packets addressed to access terminals, the packets respectively comprising profile IDs indicating a type of packet flow with which they are associated. At step 406, responsive to receiving the packets, access node 104 generates and queues pages in a paging queue for transmission to the access terminals, wherein the paging queue has an order, a front, and a back, and wherein queuing pages comprises initializing an aging value for each queued page.

At step 408, based on the profile IDs in the received packets, access node 104 determines for each queued page a level of latency-sensitivity among a plurality of possible levels of latency-sensitivity, wherein each level is associated with a respective (i.e. potentially different) max-delay parameter. Note that method 400 is generalized to contemplate any number of levels of latency-sensitivity (as compared with the two levels (latency-sensitive and latency-tolerant) of method 300.

At step 410, access node 104 assesses the pages in the paging queue in the order, which involves (a) repeatedly comparing the aging value of whichever page is currently in the front of the paging queue with the max-delay parameter associated with the level of latency-sensitivity for that page, (b) sending that page to the back of the queue if the aging value is less than the associated max-delay parameter, and (c) transmitting the page in the wireless coverage area if the aging value is greater than or equal to the associated max-delay parameter.

4. Conclusion

Various exemplary embodiments have been described above. Those skilled in the art will understand, however, that changes and modifications may be made to those examples without departing from the scope of the claims.

The invention claimed is:

1. A method comprising:

providing service to a plurality of access terminals in a wireless coverage area;

receiving data respectively addressed to at least some of the access terminals, and responsively (i) generating pages for transmission in the wireless coverage area and (ii) adding the generated pages to a back of a queue, the queue being ordered from a front to the back, wherein each such page comprises information to alert a given access terminal as to the receipt of data addressed to the given access terminal and to cause the given access terminal to request a traffic channel for conducting a packet flow;

determining which pages in the queue are latency-sensitive pages respectively associated with latency-sensitive packet flows, and which pages in the queue are latency-tolerant pages respectively associated with latency-tolerant packet flows, and responsively associating a respective aging value with any latency-tolerant pages, wherein each aging value is initialized to a starting value; and transmitting the pages in the queue over a control channel in the wireless coverage area, wherein transmitting the pages in the queue over the control channel in the wireless coverage area comprises:

(a) assessing the pages in the queue on a first-in, first-out basis;

(b) transmitting latency-sensitive pages when those pages reach the front of the queue;

(c) sending latency-tolerant pages to the back of the queue and incrementing their aging value when those pages reach the front of the queue with an aging value that is less than a maximum-delay parameter; and (d) transmitting latency-tolerant pages when those pages reach the front of the queue with an aging value that is greater than or equal to the maximum-delay parameter.

2. The method of claim 1, carried out by at least one of a radio network controller, a base transceiver station, and an access node.

3. The method of claim 1, carried out in response to determining that the control channel is congested.

4. The method of claim 1, wherein the starting value is zero.

5. The method of claim 4, wherein incrementing the aging value of a given latency-tolerant page comprises incrementing the aging value of the given latency-tolerant page by one.

6. The method of claim 1, wherein the wireless coverage area is a cell or a sector.

7. The method of claim 1, wherein at least one access terminal is a device selected from the group consisting of a cell phone, a personal digital assistant, a computer, a laptop computer, a hybrid IS-2000/IS-856 device, and a multi-mode Wi-Fi/cellular device.

8. The method of claim 1, further comprising respectively negotiating with the access terminals a set of types of packet flows in which the access terminals are capable of engaging and permitted to engage.

9. The method of claim 1, wherein determining which pages in the queue are latency-sensitive pages respectively associated with latency-sensitive packet flows, and which pages in the queue are latency-tolerant pages respectively associated with latency-tolerant packet flows comprises referencing correlation data that correlates each of a plurality of packet-flow types with an indication of being latency-sensitive or rather with an indication of being latency-tolerant.

10. The method of claim 1, wherein the data addressed to a given access terminal is associated with a packet-flow-type indication, and wherein determining which pages in the queue are latency-sensitive pages respectively associated with latency-sensitive packet flows, and which pages in the queue are latency-tolerant pages respectively associated with latency-tolerant packet flows comprises determining whether the packet-flow-type indication is associated with latency-sensitivity or rather with latency-tolerance.

11. The method of claim 10, wherein the data addressed to the given access terminal comprises the packet-flow-type indication.

12. The method of claim 10, wherein the packet-flow-type indication is a profile ID.

13. The method of claim 10, wherein the packet-flow-type indication indicates that an associated packet flow is of a type selected from the group consisting of Voice over Internet Protocol (VoIP), push-to-talk (PTT), high-performance push-to-talk (HPPTT), streaming-video, streaming-audio, video-telephony, best efforts, web-browsing, and file transfer protocol (FTP).

14. The method of claim 10, wherein the packet-flow-type indication indicates that an associated packet flow is a push-to-x (PTX) packet flow.

15. An access node comprising:

a communication interface;

a processor; and data storage comprising instructions executable by the processor for carrying out functions including:

providing service to a plurality of access terminals in a wireless coverage area;

receiving data respectively addressed to at least some of the access terminals, and responsively (i) generating pages for transmission in the wireless coverage area and (ii) adding the generated pages to a back of a queue, the queue being ordered from a front to the back, wherein each such page comprises information to alert a given access terminal as to the receipt of data addressed to the given access terminal and to cause the given access terminal to request a traffic channel for conducting a packet flow;

determining which pages in the queue are latency-sensitive pages respectively associated with latency-sensitive packet flows, and which pages in the queue are latency-tolerant pages respectively associated with latency-tolerant packet flows, and responsively associating a respective aging value with any latency-tolerant pages, wherein each aging value is initialized to a starting value; and transmitting the pages in the queue over a control channel in the wireless coverage area, wherein transmitting the pages in the queue over the control channel in the wireless coverage area comprises:

(a) assessing the pages in the queue on a first-in, first-out basis;

(b) transmitting latency-sensitive pages when those pages reach the front of the queue;

(c) sending latency-tolerant pages to the back of the queue and incrementing their aging value when those pages reach the front of the queue with an aging value that is less than a maximum-delay parameter; and (d) transmitting latency-tolerant pages when those pages reach the front of the queue with an aging value that is greater than or equal to the maximum-delay parameter.

16. The access node of claim 15, wherein the starting value is zero, and wherein incrementing the aging value of a given latency-tolerant page comprises incrementing the aging value of the given latency-tolerant page by one.

17. The access node of claim 15, wherein determining which pages in the queue are latency-sensitive pages respectively associated with latency-sensitive packet flows, and which pages in the queue are latency-tolerant pages respectively associated with latency-tolerant packet flows comprises referencing correlation data that correlates each of a plurality of packet-flow types with an indication of being latency-sensitive or rather with an indication of being latency-tolerant.

18. The access node of claim 15, wherein the data addressed to a given access terminal is associated with a packet-flow-type indication, and wherein determining which pages in the queue are latency-sensitive pages respectively associated with latency-sensitive packet flows, and which pages in the queue are latency-tolerant pages respectively associated with latency-tolerant packet flows comprises determining whether the packet-flow-type indication is associated with latency-sensitivity or rather with latency-tolerance.

19. The access node of claim 18, wherein the packet-flow-type indication is a profile ID.

20. The access node of claim 18, wherein the packet-flow-type indication indicates that an associated packet flow is of a type selected from the group consisting of Voice over Internet Protocol (VoIP), push-to-talk (PTT), high-performance push-to-talk (HPPTT), streaming-video, streaming-audio, video-telephony, best efforts, web-browsing, and file transfer protocol (FTP).

21. The access node of claim 18, wherein the packet-flow-type indication indicates that an associated packet flow is a push-to-x (PTX) packet flow.

* * * * *